United States Patent [19]

Willetts

[11] 4,162,799
[45] Jul. 31, 1979

[54] TRUCK SUSPENSION SYSTEM

[76] Inventor: Elwood H. Willetts, 102 S. Penataquit Ave., Bay Shore, N.Y. 11706

[21] Appl. No.: 820,369

[22] Filed: Jul. 29, 1977

Related U.S. Application Data

[63] Continuation-in-part of Ser. No. 807,002, Jun. 16, 1977, Pat. No. 4,132,432.

[51] Int. Cl.² .............................................. B60G 5/00
[52] U.S. Cl. .................................. 280/683; 267/63 R
[58] Field of Search ............... 280/676, 683, 682, 687, 280/681, 712; 267/21, 35, 63

[56] References Cited

U.S. PATENT DOCUMENTS

| | | | |
|---|---|---|---|
| 2,442,354 | 6/1948 | Gordon | 280/683 |
| 3,572,745 | 3/1971 | Willetts | 280/687 |
| 4,030,738 | 6/1977 | Willetts | 280/683 |

Primary Examiner—Philip Goodman
Attorney, Agent, or Firm—Paul J. Sutton

[57] ABSTRACT

The present invention discloses a multiple axle truck suspension structure and system for vehicles wherein road and tire excitations of each axle are isolated from their opposing axle, as well as from the sprung mass. This is accomplished via deflections of pressure-resistant spring means and load-equalizing supports. In a preferred embodiment of this invention, a truck version of my novel vehicle suspension system is disclosed as having separately trunnioned rocker beam assemblies supported by cross axles, and wherein an equalizer interconnects air and elastomeric spring means. The equalizer is pivotally connected to either one or both vertical legs of opposing rocker beams, and is reactive on opposing axles, to enable more instantaneous dynamic deflecton of the combined air and elastomeric spring means than the elastomeric hysteresis would otherwise permit. The air spring relieves the hysteresis resistance of the elastomeric spring means on initial impacts. The elastomer also serves to partially dampen the air spring, as well as to provide load deflection resistance.

2 Claims, 1 Drawing Figure

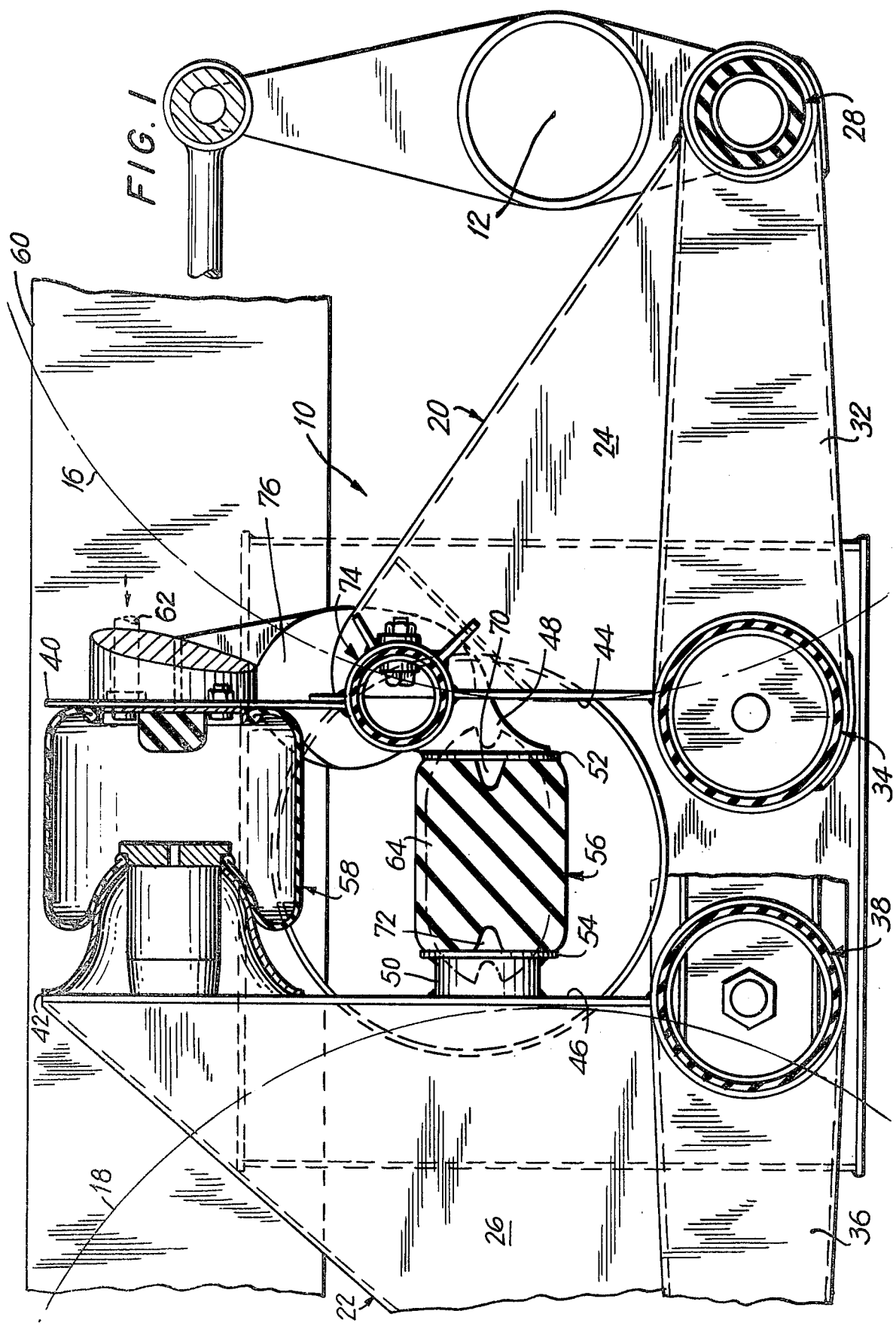

TRUCK SUSPENSION SYSTEM

This is a continuation-in-part patent application of my newly-filed pending application entitled "Multiple Axle Suspension System," Ser. No. 807,002, U.S. Pat. No. 4,132,632 filed June 16, 1977, as well as my pending application Ser. No. 706,730 filed July 19, 1976 now U.S. Pat. No. 4,030,738 and entitled Tandem Axle Vehicle Suspension System. The subject matter of my U.S. Pat. No. 3,856,325, granted on Dec. 24, 1974, is incorporated by reference within this specification. In addition, my U.S. Pat. No. 3,572,745 granted on Mar. 30, 1971 is to be incorporated by reference within this application, the latter being a continuation-in-part of application Ser. No. 721,558, filed Apr. 1, 1968, now abandoned, and application Ser. No. 649,602 filed June 28, 1967, now abandoned.

This invention relates generally to suspension structures for use with multiple axle vehicles, and more specifically, this invention relates to a composite, multiple spring means suspension structure for tandem axles, which exhibits a progressively increasing spring rate under and when subjected to increasing loads.

A suspension system contemplated by one embodiment of this invention includes a vehicle frame which is supported by a bracket depending downwardly from the frame. The bracket is supported by a pair of rocker beams having horizontal and vertical components. The horizontal components of the rocker beam are supported by a pair of laterally extending vehicle axles by and suitable means.

In the present invention, an air spring is employed to which air is supplied at varying pressures depending upon the load on the suspension. A relatively simple height gauge may be located between the axle and frame to sense and control the pressure. An elastomer both provides load deflection resistance to an undersized air spring and dampens the air pring. An optional hydraulic system, while not disclosed, is contemplated as coming within the scope of my invention and may also be used to dampen the air spring.

The present invention that will be described within this specification and accompanying drawings applies particularly to a suspension system for a short wheel base bogie of a truck-tractor, rather than the so-called wide spreads or extended wheel bases or special length trucks. As now used, air suspensions on conventional truck-tractors comprise a short beam hinged below the vehicle frame and supported by a cross axle, with an air spring disposed outwardly of the axle between the top of the beam and the underside of the frame. The support beam simply does not afford sufficient transverse vertical freedom to the axle, as is obtained with other suspensions, nor is there proper load equalization between the axles.

Air springs have not been commercially used on truck-tractors having separately trunnioned and oppositely disposed rocker beams restrained against load deflection by a compressive spring means disposed between the vertically extending components of the rocker beams. This has been due to the fact that designers have not found adequate space for the air spring system. Furthermore, the interconnecting prop shaft of a tractor extends longitudinally within the frame, which precludes the arrangement taught by U.S. Pat. No. 3,003,781 for trailers, granted to Black.

With the loaded height of a frame restricted to 38 inches, in order to enable fifth wheel engagement with the trailer, this space in a 50 inch wheel base bogie, with sufficient articulation clearance at the tires, enables but a 9-inch diameter air spring with a 3600 pound capacity. In order to clear the fifth wheel, the 9-inch air spring may be disposed or located approximately 20.5 inches over the trunnion assembly which, in turn, is 21 inches from the axle. In such an arrangement, the air spring will supply but 49 percent of the 7200 pound unsprung wheel load.

According to one aspect of the present invention, a novel arrangement of a spring means over and between the tires of adjacent axles will provide deflection reaction on both axles, while enabling the isolation of excitations of each axle from the sprung mass and from the opposing axle, thus preventing resonance and resultant wheel hop.

A comparison of some 37 tractor suspensions shows that the average price and weight of 25 leaf-type spring suspensions is approximately $554 and 1,018 lbs. The price and weight for 12 air spring suspensions averages $513 more and 88 lbs. more than for a leaf spring suspension. Yet, air suspensions that are currently in use simply lack equalization of load between the axles and further lack equalization of the load between opposite ends of an axle until the increased load torsionally deflects the support beam, while a track bar is installed transversely for each axle.

The present invention overcomes disadvantages and drawbacks of prior art attempts to solve the aforesaid problems by providing a basic preferred suspension system or structure to which a number of different spring means may be applied.

A spring means arrangement includes an equalized elastomer-supported air spring arrangement wherein the air spring and the elastomer are disposed in parallel with respect to one another and wherein both the air spring and the elastomer are reactive on both axles. This embodiment of the invention is most beneficial where restricted control of frame deflection is required through the load range of the suspension. The parallel arrangement of the air spring and elastomer affords the required spring force within the space limitations available in a short wheel base suspension. In this arrangement, an equalizer interconnects air and elastomeric spring means and is pivotally connected to either one or both vertical legs of opposing rocker beams. The air spring affords control of the frame height through air pressure which is varied, depending upon the load on the suspension, and relieves the hysteresis resistance of the elastomeric spring means on initial impacts. A valve located between the axle and frame, not shown, controls air pressure to the air spring.

The advantages of this suspension structure include an economy of both cost and weight. In addition, the spring forces are on each transverse side of the suspension structure and are reactive on both axles, thus requiring but two, instead of four, air springs. Four air springs are commonly employed with conventional suspension structures known to the prior art.

It is an object of the present invention to provide a suspension system of the novel type just described above, wherein air and elastomeric spring means are cooperatively interconnected via an equalizing hinge or trunnion such that dynamic deflections are substantially instantaneously accommodated.

A still further object is to provide a suspension structure employing a multiple of spring means wherein vertical freedom at opposite ends of each axle is realized throughout the load range, as with all leafspring suspensions known to the art.

Yet another object of this invention is to provide reactive spring means which serves to isolate the sprung mass from the excitations of each axle, as well as from the opposing axle.

Still a further object is to provide a multiple spring arrangement wherein axial alignment of the spring elements is preserved, while reducing the cost, weight and complexity of the suspension while all the time improving the performance characteristics of the suspension system over what is commonly realized in presently known air suspensions.

The invention will be more clearly understood from the following description of specific embodiments of the invention, together with the accompanying drawing, wherein similar reference characters denote similar elements throughout the several views, and in which:

FIG. 1 is a fragmentary sectional elevational view of one embodiment of the present invention, wherein a combination of spring means are utilized, namely elastomeric spring means and air-type spring means;

Referring now in more detail to the drawing provided with this application, FIG. 1 illustrates in a fragmentary sectional elevational-type view, a combination of elastomer and spring means whereby the elastomer virtually supports in parallel configuration the spring means located thereabove. A suspension system 10 includes a pair of axles 12 and 14, respectively, which are spaced longitudinally along the axis of the vehicle with supporting tires 16 and 18 shown in phantom outline. By my use of the word "tire" in describing tires 16 and 18, the reader should keep in mind that this use of the phrase refers to the outside diameter of 10.00-20 tires, for example, in each case, as reflected by the phantom outline.

Suspension system 10 consists of an overall structure which includes rocker beam assemblies 20 and 22, each possessing vertically extending beam portions 24 and 26, respectively. Beam portions 24 and 26 are trunnioned in bushing assemblies 34 and 38, respectively, and are supported in assemblies being carried by hanger brackets of types illustrated in previous of my patents and referred to as axle hanger brackets (not shown with a reference character in these drawings). While the heart of the present invention does not reside in the specific makeup and structure of bushing assemblies 28, and 30 not shown, of the present invention, it should be noted that these bushing assemblies are deflectable radially, torsionally and axially.

Referring now to the makeup of the structure of rocker beam assemblies 20 and 22, it can be seen in FIG. 1 that a horizontal component rocker beam portion 32 interconnects by a welded attachment bushing assembly 28 and a trunnion assembly 34. Similarly, a horizontal component rocker beam member 36 interconnects bushing assembly 30 with a trunnion assembly 38. It can be seen from FIG. 1 that bushing assemblies 28 and 30, as well as trunnion assemblies 34 and 38, lie along a common centerline which extends substantially horizontally of suspension system 10.

Rocker beam assemblies 20 and 22, apart from the equalizing means that will be described below, and in addition to the horizontal component members 32 and 36, further include their respective vertically extending or upstanding beams 24 and 26 which extend integrally from members 32 and 36, respectively, towards upper rocker beam ends 40 and 42 thereof, respectively. Beams 24 and 26 near ends 40 and 42 include vertically extending and oppositely extending or opposed faces 44 and 46, respectively. Faces 44 and 46 extend upwardly from inclined portions of beams 24 and 26 to upper ends 40 and 42 of these same beams. It should be noted that member 48 comprises an integral part of lever 76, described further below. Face 44 extends vertically to the outer hub of trunnion 74, with lever 76 fitting transversely between faces 74—74 and extending from plate 52 upwardly to upper end 40 via curved stiffening ribs illustrated in the drawing.

Also attached to rocker beam portions 24 and 26, which comprise vertical components of rocker beam assemblies 20 and 22, are opposed and inwardly projecting members 48 and 50 which extend to and into integral welded contact with opposed face plates 52 and 54 of the opposite ends of elastomer spring seats of elastomeric assembly 56.

In a preferred embodiment of the present invention of the design shown in FIG. 1, all of the structural elements that have been described so far are preferably welded together, using continuous welds which exhibit the full strength characteristics of the metals, in this case SAE 950 steel.

Referring now to the "spring means" utilized within suspension system 10, we see in FIG. 1 an air spring assembly 58 disposed beneath vehicle frame 60 and supported above the elastomeric assembly 56. The present invention contemplates the use of air spring assembly 58 for operationally equalizing the load as between axles 12 and 14, with elastomeric assembly 56 serving both to dampen excitations induced in air spring assembly 58 and to supplement the forces of the air spring. An inlet conducit 62 is shown on the rightmost side of air spring assembly 58 and serves as means for providing air to air spring assembly 58.

Air spring assembly 58 is of the rolling sleeve type already described in my aforementioned patent applications.

Referring now to elastomeric assembly 56, we see in FIG. 1 an elastomeric member 64 which extends between and may be in bonded contact with plate members 52 and 54. Inwardly extending pilot members 70 and 72 penetrate opposing cavities within the ends of elastomer 64 and, being integral with plates 52 and 54, serve to captively hold the elastomer 64 therebetween during use.

At design conditions, elastomeric member 64 is preferably approximately 6.4 inches long and exhibits characteristics of 8800 pounds at load deflection.

Where the hysteresis of an elastomer is not sufficiently high to dampen both the elastomer and the air spring, a conventional shock absorber may be disposed in parallel relationship to the elastomer and outwardly thereof. Where so used, it is reactive on both axles, thus but two such shocks may optionally be used with this spring system, while four such larger shocks are required with known air spring suspensions. Shocks are not necessary with the present invention and, as such, are not shown in the drawing.

As shown in FIG. 1, elastomeric member 64 and its associated components of elastomeric assembly 56 are preferably disposed substantially beneath frame 60 of suspension system 10, while air spring assembly 58 is disposed or located outboard of frame 60 and at a relative elevation with respect to frame 60, best seen in the drawing. In the embodiment of the invention shown, the approximate distance of the top of frame 60, a 10.5 channel member, to the ground on which tires 16 and 18 rest, is 38 inches. With a suspension structure having a 50-inch wheel base, this system 10 is able to accommodate at each bushing assembly 28, 30 a sprung load of 7200 pounds.

Referring now to an improvement of particular interest, the reader will see in the drawing that the vertical component portion 24 of rocker beam assembly 20 is shortened and does not extend integrally and rigidly to face plate 52, as is the case with previous of my inventions. Instead, with the present invention, artiuculation at a hinge base or trunnion assembly 74 is accomplished, with an equalizing lever 76 extending from trunnion 74 upwardly to one side of air spring 58. It should be noted that the distance between trunnion 74 and the air spring (via lever 76) is greater than the distance between this same equalizing trunnion and elastomer 64, the latter being more forceful, thus providing equalizing means between the air spring and the elastomer at hinge or trunnion 74.

It should be emphasized here that the provision of the subject equalizing means serves as its object to balance the static forces at the upper part of one of the rocker beams, and in so doing in the manner described, it enables a more instantaneous dynamic deflection of the combined air and elastomeric spring means than would otherwise be possible with the hysteresis characteristics of elastomeric member 64 alone. Thus, sudden impacts may be cushioned with less resistance proportional to the lesser dynamic resistance of the air spring than that of the elastomer, whose hysteresis is high in order to facilitate a dampening of excitations within the air spring. This substantially provides the user with the ride softness of a 100% air spring.

In operation, other than the equalizing feature just described, the suspension system 10 shown and described in detail above, serves to accomplish an end that has been sought by many of my previous patents, namely to equalize and isolate road-induced excitations in one axle from another axle within the suspension. In suspension system 10, as the axles are deflected upwardly, and as excitations are induced in each, the rocker beam assemblies 20 and 22, together with their component beam members, pivot about the axes of trunnion assemblies 34 and 38 such that the air spring and elastomer assembly 58-56 takes or absorbs the load. It is an object of this invention to prevent the transmission of forces from one axle to the other axle, namely from axle 12 to axle 14, for example. The air spring assembly 58 and the elastomer assembly 56 combine to isolate them. The air spring is here disposed to best utilize the greater compressibility of air than of an elastomer, although the frequency is the same. However, there will be undamped excitations induced with the air spring assembly itself and it is desired to dampen these excitations. It is here that elastomeric assembly 56 comes into play.

Assembly 56, with its elastomeric member that exhibits a progressively increasing spring rate with increasing load, serves to dampen the excitations within air spring assembly 58, and to provide the user of suspension system 10 with a smooth and comfortable ride.

What is claimed is:

1. A multiple axle vehicle suspension structure, comprising, in combination: transversely extending axles spaced from one another longitudinally with respect to the longitudinal axis of said vehicle suspension structure, frame members spaced transversely with respect to one another and extending between said axles, opposing rocker beam assemblies separately trunnioned in said structure at an elevation beneath the elevation of said frame members, said opposing rocker beam assemblies being supported at longitudinally extending ends thereof by said axles, multiple spring means reactive with respect to said axles for operationally equalizing the load as between said axles, said multiple spring means comprising an air spring and a compressive means disposed in parallel and both intermediate and cooperative with upwardly extending faces of said opposing rocker beam assemblies, said compressive means comprising a compressive resistant elastomer as a spring member and being characterized by the absense of spring members and means other than said elastomer, said elastomeric member disposed beneath said air spring and above trunnion points of said rocker beam assemblies.

2. A multiple axis vehicle suspension structure according to claim 1, further comprising an equalizing lever hinged to and comprising part of the vertically extending portion of at least one of said rocker beam assemblies, said lever interconnecting said air spring at its upper end and said elastomer at its lower end.

* * * * *